United States Patent [19]
Rimback et al.

[11] Patent Number: 5,416,464
[45] Date of Patent: May 16, 1995

[54] VEHICLE ANTI-THEFT ALARM SYSTEM

[75] Inventors: Peter D. Rimback, Warren; Danut D. Voiculescu, Cleveland; John Rutkoski, Cuyahoga Falls; Louis D. Carlo, Litzhfield, all of Ohio

[73] Assignee: Winner International Royalty Corporation, Sharon, Pa.

[21] Appl. No.: 51,173

[22] Filed: Apr. 22, 1993

[51] Int. Cl.⁶ .............................................. B62H 5/00
[52] U.S. Cl. ..................................... 340/426; 340/552
[58] Field of Search ...................... 340/425.5, 426, 552, 340/553, 554; 187/140

[56] References Cited
U.S. PATENT DOCUMENTS

| | | | |
|---|---|---|---|
| 3,754,254 | 8/1973 | Jinman | 343/7.7 |
| 4,092,636 | 5/1978 | Shepherd, Jr. | 340/552 X |
| 4,929,925 | 5/1990 | Bodine et al. | 340/426 |
| 5,347,094 | 9/1994 | Leone et al. | 187/140 |

Primary Examiner—James J. Groody
Assistant Examiner—Nathan J. Flynn
Attorney, Agent, or Firm—Vickers, Daniels & Young

[57] ABSTRACT

A vehicle anti-theft alarm system comprises a microwave transmitter and receiver for transmitting microwave frequency signals from one location in the vehicle against a target in the vehicle at a given distance from the transmitter-receiver and for receiving the signals reflected back from the target and producing a monitoring signal representative of a time, frequency or distance parameter for sending and receiving the signals. If, for example, an object is interposed in the path of the transmitted signals, the parameter and thus the monitoring signal changes and a control signal is produced for actuating an alarm. A holding circuit provides for the alarm to remain actuated when the article is removed from the path of the transmitted signals.

18 Claims, 4 Drawing Sheets

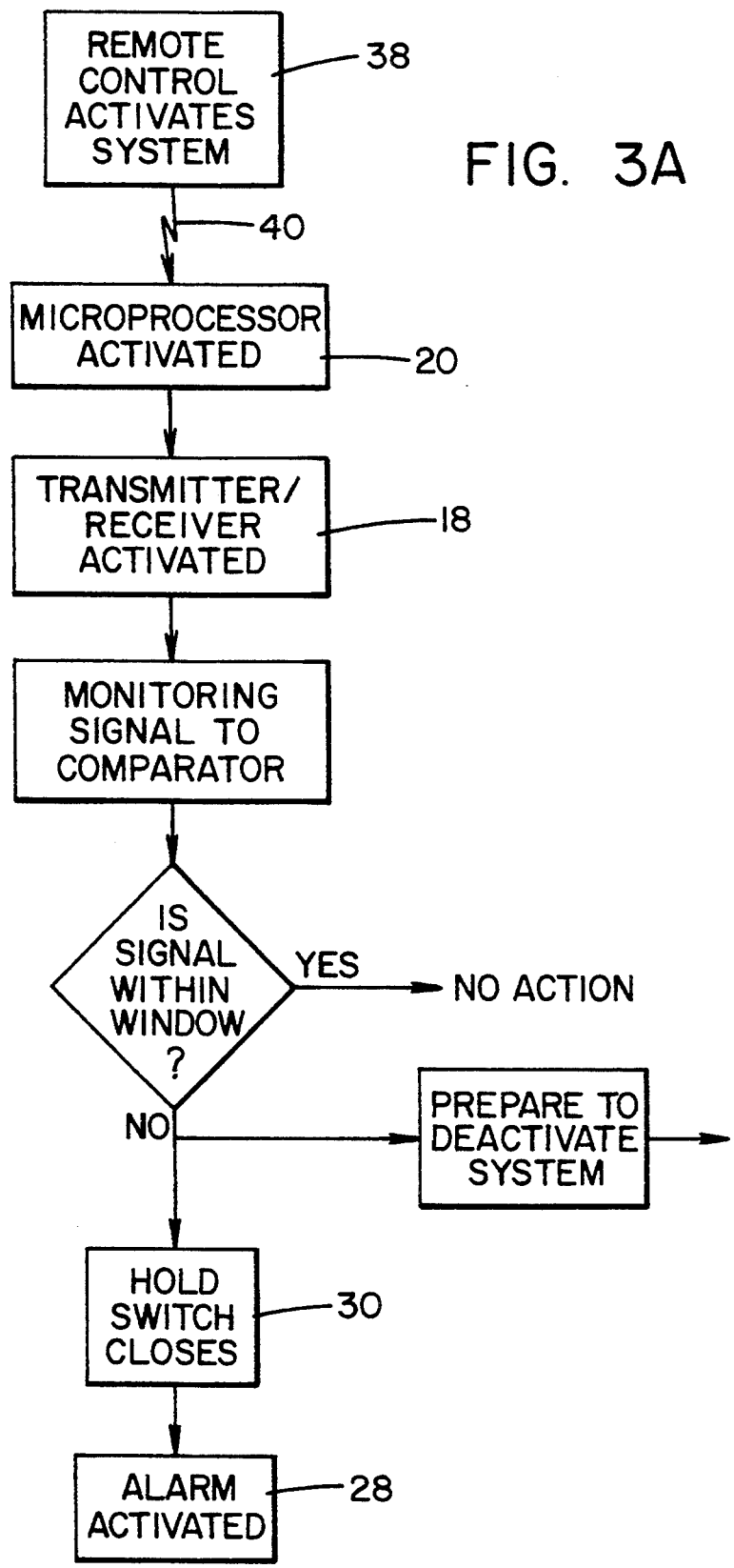

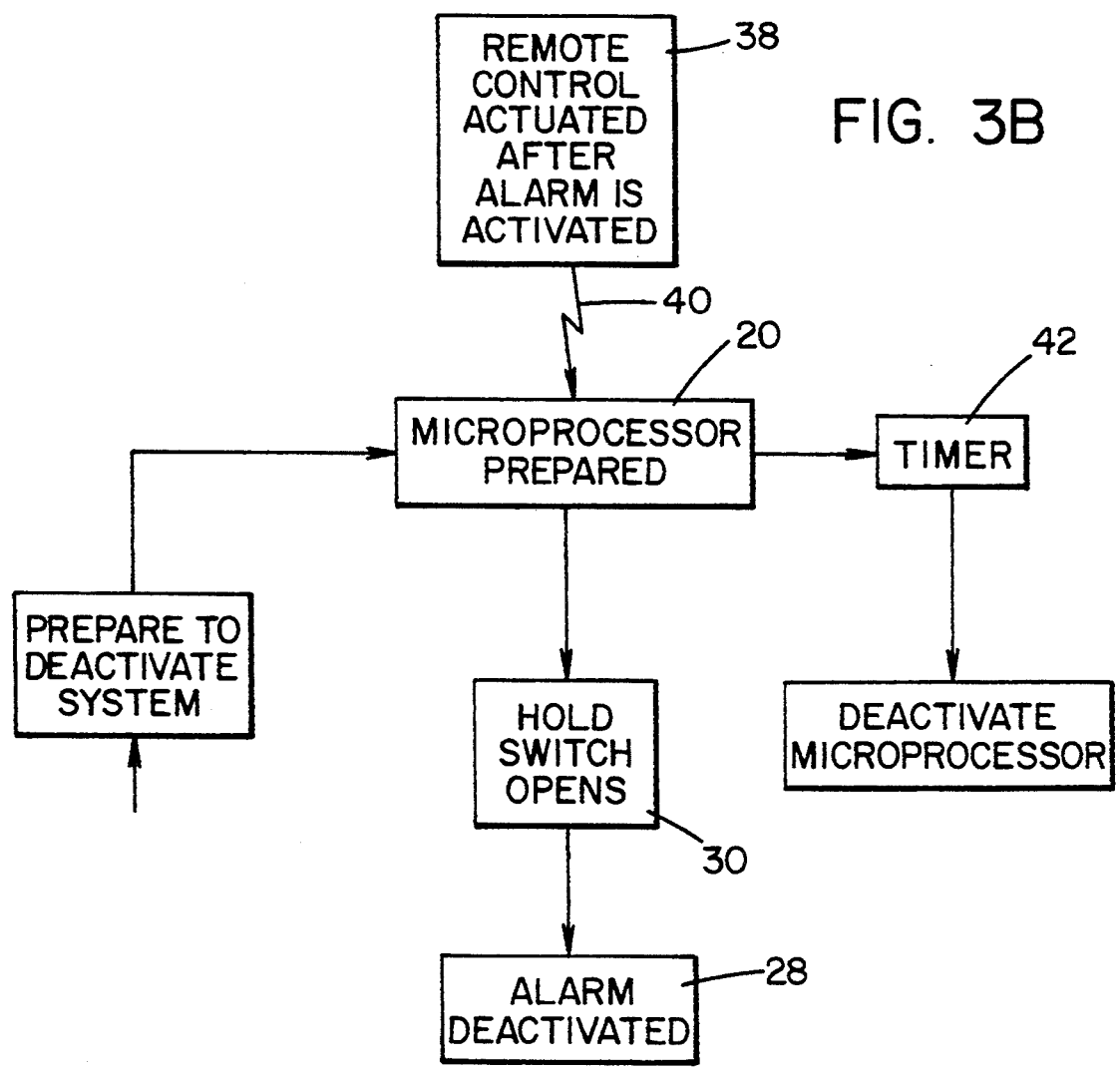

VEHICLE ANTI-THEFT ALARM SYSTEM

BACKGROUND OF THE INVENTION

The present invention relates to the art of vehicle anti-theft devices and systems and, more particularly, to systems producing an audio and/or visual alarm in response to unauthorized entry into, or attempted unauthorized entry into a vehicle.

The present invention finds particular utility in connection with detecting the unauthorized entry into the driver and passenger compartment of a vehicle and, accordingly, will be described in detail herein in connection with such use. At the same time, however, it will be appreciated that the invention has other utility such as detecting the unauthorized opening of a vehicle compartment enclosure such as a door for the driver and passenger compartment, the hood closing a vehicle motor compartment and/or a vehicle trunk lid.

Over the past several years, there has been an increasing demand by vehicle owners for security devices to deter or prevent vehicle theft and unauthorized entry into the interior of a vehicle or into the engine compartment or trunk. A wide variety of anti-theft devices and systems have been developed in an effort to minimize the foregoing and other security problems. Such devices include, for example, steering wheel locks, alarm systems and devices which disable certain components of the vehicle when a theft is attempted, and electronic security systems which actuate an alarm in response to the detection of vibration or other motion of the vehicle when the security system is activated. Steering wheel locks are of course a good deterrent against theft of a vehicle in that they preclude steering thereof. At the same time, they do not preclude a thief from breaking into the vehicle driver and passenger compartment or opening the hood and/or trunk for the purpose of stealing items such as radio equipment, the vehicle battery, a spare tire and any other valuable objects which may have been left in the vehicle. The electronic systems heretofore provided are intended, primarily, to deter unauthorized entry into any compartment of the vehicle and, in this respect, function in response to vibration of the vehicle to actuate horns, sirens and/or blinking lights to frighten a would be thief away. A persistent problem with such vibration responsive security systems is the difficulty to adjust the sensitivity thereof so that they are neither over or under sensitive. In this respect, if they are too sensitive, the alarm can be actuated by wind or other minor movement of the vehicle. On the other hand, if they are not sensitive enough, it is possible to carefully gain entry to the vehicle without setting the alarm off. This sensitivity problem negatively affects the efficiency of such a security system for its intended purpose and negatively affects customer acceptance of such systems as a viable deterrent to unauthorized entry and/or theft of a vehicle or articles therein. In particular in this respect, the actuation of such alarm systems in response to movement of a vehicle other than that created by a would be thief has become prevalent to the extent that the audio and/or visual alarms are often ignored by persons who might otherwise intervene and/or take notice of a thief so as to be able to identify the latter to authorities.

SUMMARY OF THE INVENTION

In accordance with the present invention, a vehicle anti-theft security system is provided which minimizes or overcomes the foregoing disadvantages in connection with systems intended primarily to deter unauthorized entry into a vehicle compartment. More particularly in this respect, a security system in accordance with the present invention is not actuated in response to vehicle motion or vibration but, rather, to the unauthorized opening of a vehicle closure member and/or to the unauthorized physical entry into the driver and passenger compartment of the vehicle. Accordingly, the system cannot be actuated other than by physical displacement of a closure member such as a door, trunk lid or hood of a vehicle from the closed position thereof, or by a person opening a door of the vehicle and entering the driver and passenger compartment thereof. This, other than for accidental actuation of the system by the vehicle owner, advantageously limits actuation of the system to a positive unauthorized attempt to enter the vehicle and thus promotes awareness that the audio and/or visual alarm signal from the system is indicative of a real theft situation.

Further, in accordance with the invention, the anti-theft system operates in a manner similar to radar in that microwave frequency signals are transmitted against a fixed target in the vehicle and reflected back from the target to enable establishing a monitoring signal representative of the frequency, time and distance parameters for the transmitted and reflected signals. For example, a microwave transmitter-receiver can be mounted on the interior side of the fire wall of a vehicle on the driver's side thereof so as to transmit signals of microwave frequency against the front of the driver's seat which provides the target. The signals are reflected back to the transmitter-receiver from the target in a predetermined time depending on the distance between the transmitter-receiver and the seat or target. The interposition of an object between the transmitter-receiver and seat or target, such as the legs of a would be thief, increases the frequency of the signals and reduces the time for the signals to be transmitted and returned to the transmitter-receiver and, therefore, changes the monitoring signal. Such change in the monitoring signal causes actuation of an audible and/or visible alarm, such as a siren, the vehicle horn and/or the vehicle lights. In accordance with one aspect of the invention, the alarm or alarms when so actuated are maintained operable by a holding circuit therefor, regardless of whether or not the object is removed from between the transmitter-receiver and target, or the remainder of the system is disabled by the would be thief. Preferably in this respect, the security system is energized by the vehicle battery and the holding circuit connects the audible and/or visible alarm directly to the battery so as to maintain the alarm signal independent of the remainder of the security system.

In accordance with another aspect of the invention, the target for the transmitted microwave frequency signals can be a closure member for a vehicle compartment, such as a door to the driver and passenger compartment, the trunk lid and/or the vehicle hood. In an arrangement of this character, the transmitter-receiver would be mounted in the corresponding compartment at a fixed location relative to the closure member when the latter is in its closed position relative to the compartment. The monitoring signal in this instance changes upon opening of the closure member, whereupon the alarm signal is actuated. Again, a holding circuit is preferably provided for maintaining the alarm signal or signals, regardless of whether the closure is returned to its closed position relative to the compartment and/or the remainder of the system is disabled.

It is accordingly an outstanding object of the present invention to provide an improved vehicle anti-theft security system operable upon unauthorized opening of a vehicle compartment closure and/or unauthorized entry into the driver-passenger compartment of a vehicle to actuate audible and/or visible alarms.

Another object is the provision of a security system of the foregoing character which is operable to eliminate actuation of the alarm or alarms in the absence of an actual unauthorized intrusion into a compartment of the vehicle.

Yet another object is the provision of a security system of the foregoing character which is operable, when actuated, to maintain the audible and/or visible alarm signals independent of the actuating portion of the alarm system and independent of removal of the intrusive action.

Still a further object is the provision of a security system of the foregoing character employing a microwave frequency signal transmitter-receiver for transmitting a signal against a target in or associated with a vehicle compartment and receiving the signal reflected back from the target to provide a monitoring signal which changes in magnitude in response to an unauthorized intrusion into the vehicle compartment and provides the basis for actuating the alarm signal or signals.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 3A is a flow chart of the operation of the system in response to unauthorized entry into the vehicle; and FIG. 3B is a flow chart showing the deactivating of the system following an unauthorized entry into the vehicle.

DESCRIPTION OF A PREFERRED EMBODIMENT

Figure 1:
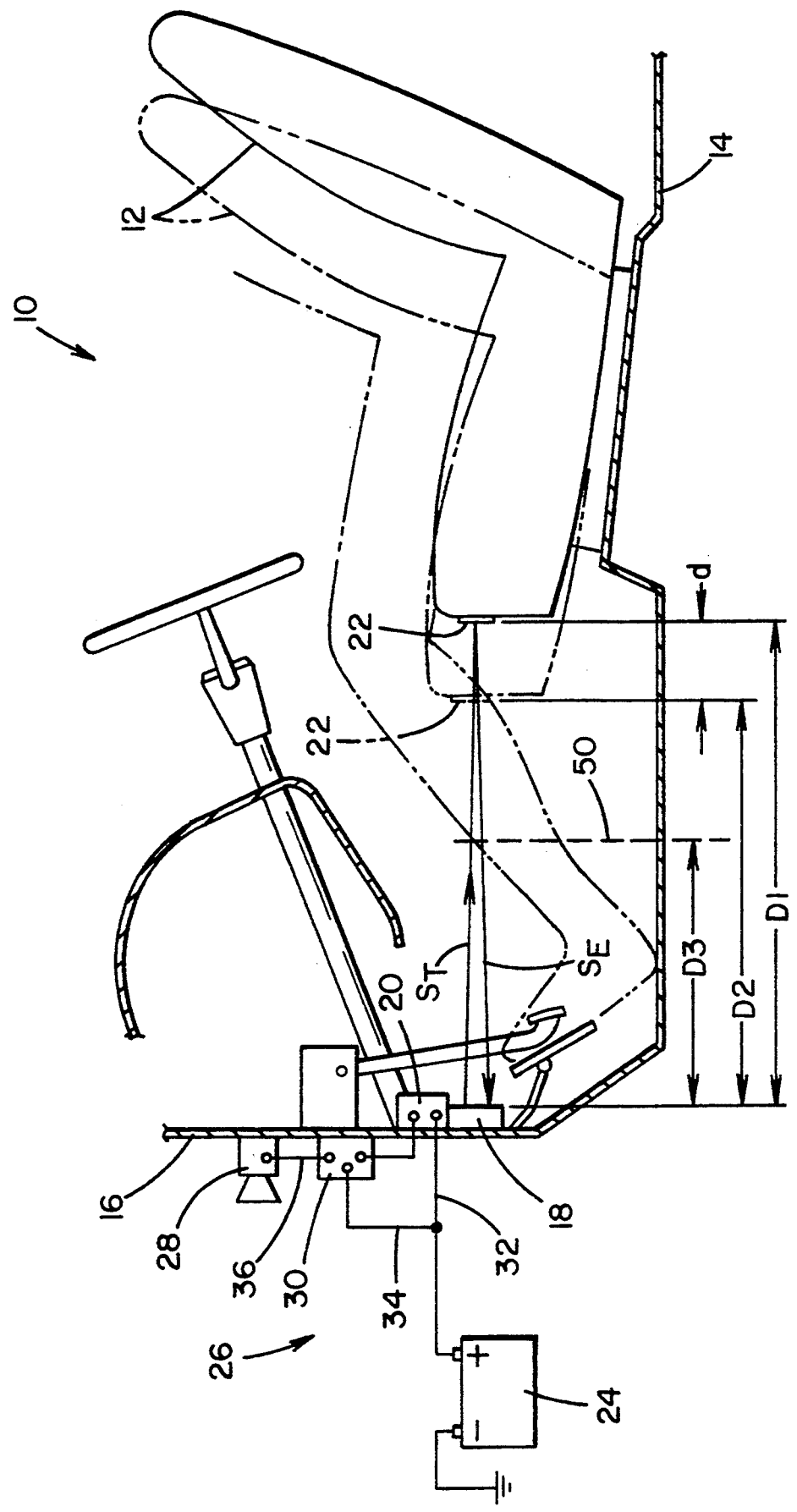
FIG. 1 is an elevation view schematically illustrating the driver's side of the driver-passenger compartment of a vehicle provided with a security system according to the present invention.

Referring now in greater detail to the drawings wherein the showings are for the purpose of illustrating a preferred embodiment of the invention only and not for the purpose of limiting the invention, FIG. 1 schematically illustrates the driver's side of the driver-passenger compartment 10 of a motor vehicle and which compartment includes a driver's seat 12 supported on the compartment floor 14 for adjustment relative thereto toward and away from the vehicle fire wall 16. In the embodiment illustrated, the vehicle anti-theft alarm system comprises a microwave transmitter-receiver 18 and a microprocessor 20 mounted on the compartment side of fire wall 16 with the transmitter-receiver 18 being positioned to transmit microwave frequency signals $S_T$ towards seat 12 and to receive reflected or echo signals $S_E$. Preferably, the microwave signals are transmitted at a frequency of about 2.5 GHz. The front of seat 12 provides a target for transmitted signal $S_T$ and, if the material of the seat is inappropriate for reflecting echo signal $S_E$, seat 12 can be provided with a target 22 of suitable material for this purpose.

The security system is preferably powered by the vehicle battery 24 located in engine compartment 26 of the vehicle, and the system further includes an alarm device 28 such as a siren, horn or the like which is actuated, as described hereinafter, through a holding switch 30. Holding switch 30 is an electronic flip-flop switch which is responsive to sequential pulse signals from microprocessor 20, as described hereinafter, to alternately change between open and closed modes and which remains in each of the modes until pulsed to the other. Preferably, both alarm 28 and holding switch 30 are mounted on the engine compartment side of fire wall 16. Battery 24 is connected to microprocessor 20 by line 32 and is adapted to be connected to alarm 28 through holding switch 30 such as by a line 34 between line 32 and holding switch 30 and line 36 between holding switch 30 and alarm 28. The system functions to be described hereinafter, including activation and de-activation of the system, are controlled by and through microprocessor 20 and, preferably, the system is activated and de-activated by a remote, hand held encoder 38 adapted to transmit radio frequency or infrared signals 40 to microprocessor 20. In a well known manner, microprocessor 20 includes a receiver responsive to sequential signals from encoder 38 to sequentially turn the system on and off. For the purposes set forth more fully hereinafter, microprocessor 20 includes a timer 42, and the system includes an adjustable reference monitoring signal generator 44.

When microprocessor 20 is activated by remote control encoder 38, the component parts of the system are connected in circuit with battery 24 through the microprocessor. In this actuated condition of the system, holding switch 30 is in the open mode whereby the circuit from battery 24 to alarm 28 is open. Microwave frequency transmitter-receiver 18 is activated by the microprocessor through line 46 and transmits microwave frequency signals $S_T$ toward target 22 and receives the echo signals $S_E$ therefrom and produces a monitoring signal which is representative of the frequency of the transmitted and received signals as well as the distance between transmitter-receiver 18 and target 22 and the time required for a given microwave frequency signal to travel from the transmitter-receiver to target 22 and back to the transmitter-receiver. This monitoring signal is outputted from transmitter-receiver 18 to microprocessor 20 through line 48 and is compared in the microprocessor with a reference monitoring signal from reference signal generator 44 which is representative of the actual frequency, distance and time criteria for the transmitter-receiver and target as relatively positioned in conjunction with installing the security system. The foregoing comparative function is continuous and the system remains in a stand-by mode so long as there is no deviation between the monitoring and reference monitoring signals. If there is no unauthorized entry, as described below, the system can be deactivated by remote controller 38 and holding switch 30 remains open.

Prior to describing the operation of the system in response to an unauthorized entry into the vehicle, reference is made to FIG. 1 wherein the illustration is indicative of the fact that the frequency, distance and time criteria are variables in connection with the disclosed embodiment as a result of the adjustability of driver's seat 12 toward and away from transmitter-receiver 18. Such adjustability provides for the front of the driver's seat and/or target 22 if the latter is applied thereto to be located between distances D1 and D2 relative to transmitter-receiver 18. Accordingly, it will be appreciated that the frequency of the monitoring signal will be greater when the seat is positioned to provide distance D2 between target 22 and transmitter-receiver 18, and that the time for transmitting and receiving a reflected microwave signal will be less when the seat is positioned to provide the distance D2 between the target and transmitter-receiver. It will likewise be appreciated that the difference d between the distances D1 and D2 provides a distance-time-frequency window which is preferably accommodated in the system so as to preclude having to adjust the reference signal generator 44 each time the driver's seat is adjusted to a position between distances D1 and D2. This is achieved by programming microprocessor 20 to respond only to a deviation between the monitoring signal and reference monitoring signal which is not within the distance-time-frequency window. This would not be necessary, of course, if the target were not adjustable relative to a transmitter-receiver.

Figure 2:
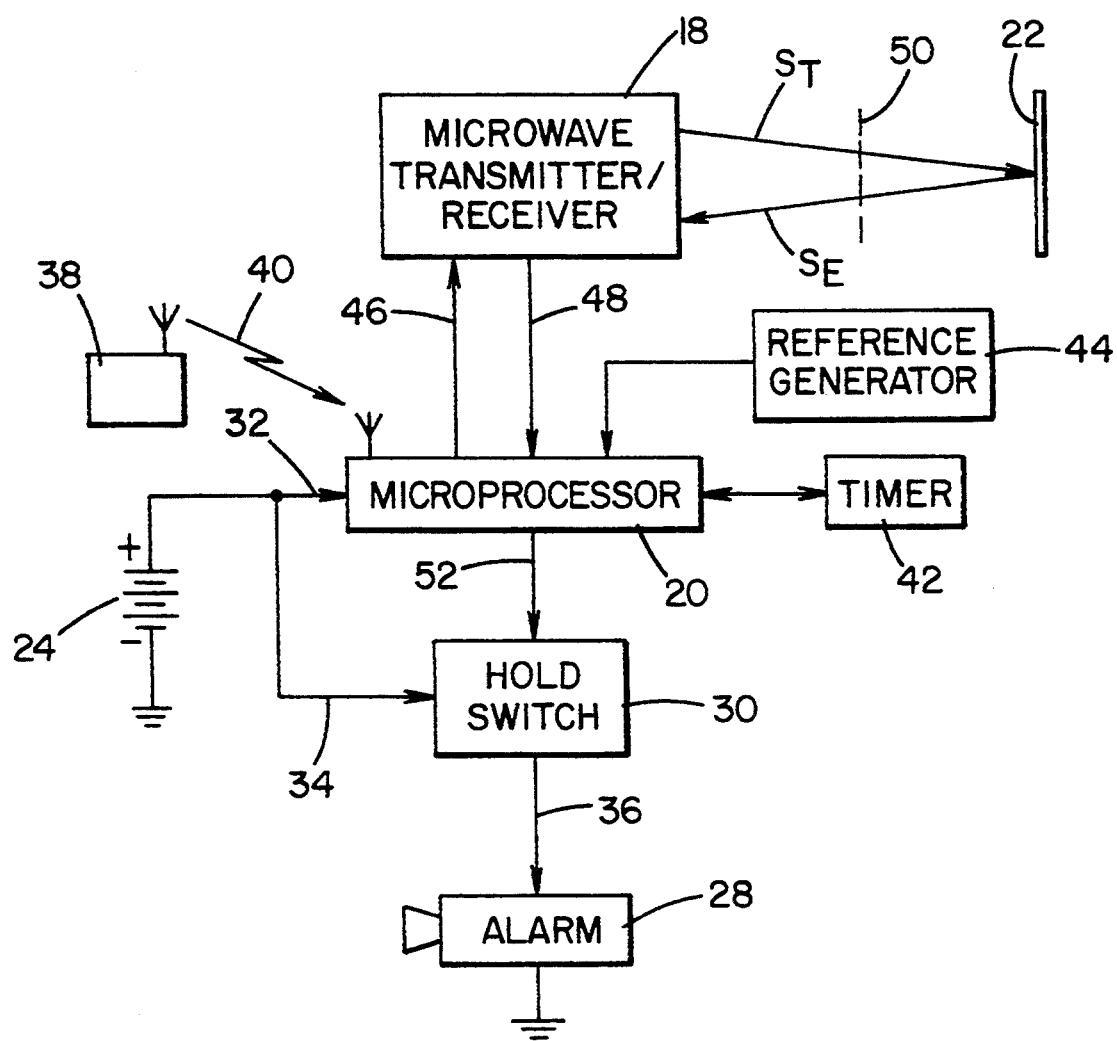
FIG. 2 is a block diagram of the security system.

Assuming now that the vehicle operator leaves the vehicle and activates the security system through remote control encoder 38 as described above, the system functions as follows and as indicated in FIG. 3A. Until such time as there is an unauthorized entry into the vehicle, the monitoring signal from transmitter-receiver 18 to microprocessor 20 through line 48 is within window d, whereby the system takes no action and remains in a standby mode in preparedness to respond the an unauthorized entry. Upon unauthorized entry, in the embodiment illustrated, the legs of a person entering compartment 10 to sit on driver's seat 12 will traverse the microwave signals $S_T$ transmitted by transmitter-receiver 18 towards target 22 at some point designated in FIGS. 1 and 2 by broken line 50 at a distance D3 from the transmitter-receiver and which distance is less than the distance D2 and thus outside the window d. Therefore, the distance and time for the transmission and return of the microwave frequency signals is decreased and the frequency thereof is increased, whereby the monitoring signal thereafter outputted from the transmitter-receiver through line 48 to microprocessor 20 is indicative of the fact that the monitoring signal is no longer within the window d. The monitoring signal is then compared in the microprocessor with the reference monitoring signal from reference signal generator 44 and, in response to the difference therebetween, the comparator outputs a control signal which in response to which microprocessor 20 outputs a pulse signal through line 52 to holding switch 30. This pulse signal actuates the holding switch to its closed mode completing the circuit between battery 24 and alarm 28, whereby the latter is actuated. Since holding switch 30 will remain in the closed mode until such time as it is pulsed back to the open mode, alarm 28 is connected to battery 24 independent of the remainder of the system and will continue to be actuated even if the object interposed between transmitter-receiver 18 and target 22 is removed or microprocessor 20 is disabled such as by removal from the fire wall or physical destruction. In the event of the latter, the alarm can be deactivated only by disconnecting the alarm from battery 24 such as by severing one of the leads 34 and 36 or disconnecting the battery.

When the system is actuated in the foregoing manner in response to an unauthorized entry, and the microprocessor is not disabled, the system can be deactivated through the use of the remotely controlled encoder 38. In this respect, as will be seen from FIGS. 3A and 3B, the comparator output control signal indicative of unauthorized entry provides an "enable" signal which prepares microprocessor 20 to deactivate the system in response to a subsequent signal received from remotely controlled encoder 38. Upon receiving such signal from the encoder, microprocessor 30 outputs a signal to timer 42 and outputs a pulse signal through line 52 to holding switch 30, whereby the latter is actuated to its open mode to disconnect alarm 28 from battery 24. Timer 42 provides a delay sufficient to assure such opening of holding switch 30 and then deactivates the microprocessor and thus the security system. This feature advantageously enables the vehicle owner to deactivate the alarm and the system in the event he or she accidentally actuates the alarm by entering the vehicle without first deactivating the system. Furthermore, this feature enables the vehicle owner to deactivate the alarm if a would-be thief has entered the vehicle and left without disabling the microprocessor.

While the embodiment illustrated in the drawings shows the transmitter-receiver and target respectively on the vehicle fire wall and driver's seat, it will be appreciated that numerous mounting arrangements are possible and that the system can be actuated in response to an unauthorized entry which would increase the distance between the transmitter-receiver and target rather than decreasing the distance by interposing an object therebetween. In this respect, for example, a transmitter-receiver could be mounted on the passenger side door and the target on the driver's side door, whereby opening of either door would increase the distance between the transmitter-receiver and target, thus changing the monitoring signal and causing the comparator to output a control signal in response thereto. Similarly, one of the transmitter-receiver and target could be in a fixed location in the driver-passenger compartment and the other on one of the compartment doors whereby opening of the door would actuate the alarm. Another possible arrangement would be to mount the transmitter-receiver on the ceiling of the driver-passenger compartment with the compartment floor, seat or other object therebeneath providing the target. It will likewise be appreciated that the security system could be provided in the trunk compartment or motor compartment of a vehicle such that opening of the trunk lid or hood would actuate the alarm. These and other mounting arrangements and locations will be obvious from the foregoing description.

While considerable emphasis has been placed herein on the embodiment illustrated and described, it will be appreciated that other embodiments of the invention can be made and that changes can be made in the disclosed embodiment without departing from the principles of the invention. In this respect, for example, while the alarm is disclosed as being a siren, it will be understood that other alarm devices can be used alone or in combination with such a siren. For example, the vehicle horn and/or lights can be connected in the alarm circuit. It will be obvious too that the hold switch can be mounted in any suitable inconspicuous location in a vehicle such as behind the dashboard for example. These and other modifications of the disclosed embodiment, as well as other embodiments of the invention, will be obvious and/or suggested to those skilled in the art upon reading the description herein, whereby it is to be distinctly understood that the foregoing descriptive matter is to be interpreted merely as illustrative of the present invention and not as a limitation.

Having thus described the invention, it is claimed:

1. A vehicle anti-theft alarm system comprising microwave transmitting and receiving means for transmitting microwave frequency signals from one location in a vehicle against a target in said vehicle at a given distance from said one location and for receiving said signals reflected back from said target and producing a monitoring signal representative of said given distance, means providing a reference signal representing said given distance, means for comparing said monitoring signal and said reference signal and producing a control signal in response to a difference therebetween representing a change in said given distance, and means responsive to said control signal for producing an alarm signal including holding circuit means for maintaining said alarm signal indeterminately and independent of said control signal and said means for producing said control signal.

2. A system according to claim 1, wherein said alarm signal is audible.

3. A system according to claim 1, wherein said means for producing said reference signal is adjustable.

4. A system according to claim 1, and means including remotely controlled encoder means for activating said alarm system.

5. A system according to claim 1, wherein said vehicle includes a battery and said holding circuit means connects said means for producing an alarm signal to said vehicle battery to maintain said alarm signal independent of said control signal and said means for producing said control signal.

6. A system according to claim 5, wherein said means for producing said reference signal is adjustable.

7. A system according to claim 6, wherein said alarm signal is audible.

8. A system according to claim 7, and means including remotely controlled encoder means for activating said alarm system.

9. A vehicle anti-theft alarm system comprising microwave transmitting and receiving means for transmitting microwave frequency signals from one location in a vehicle against a target in said vehicle at a given distance from said one location and for receiving said signals reflected back from said target, means including said transmitting and receiving means responsive to a change in said given distance for producing a control signal, and means responsive to said control signal for producing an alarm signal including holding circuit means for maintaining said alarm signal indeterminately and independent of said control signal and said means for producing said control signal.

10. A system according to claim 9, wherein said alarm signal is audible.

11. A system according to claim 9, and means including remotely controlled encoder means for activating said alarm system.

12. A system according to claim 9, wherein said vehicle includes a battery and said holding circuit means connects said means for producing an alarm signal to said vehicle battery to maintain said alarm signal independent of said control signal and said means for producing said control signal.

13. A vehicle anti-theft alarm system comprising microwave transmitting and receiving means for transmitting microwave frequency signals from one location in a vehicle against a target in said vehicle at a given distance from said one location and for receiving said signals reflected back from said target and producing a first signal representative of said given distance, means producing a second signal representative of said given distance, means for comparing said first and second signals and producing a control signal in response to a difference therebetween, and means including holding circuit means responsive to said control signal for producing an alarm signal and maintaining said alarm signal indeterminately and independent of said control signal and said means for producing said control signal.

14. A system according to claim 13, wherein said alarm signal is audible.

15. A system according to claim 14, wherein said means for producing said second signal is adjustable.

16. A system according to claim 15, and means including remotely controlled encoder means for activating said alarm system.

17. A vehicle anti-theft alarm system comprising microwave transmitting and receiving means for transmitting microwave frequency signals from one location in a vehicle against a target in said vehicle and for receiving said signals reflected back from said target to provide a monitoring frequency, means including said transmitting and receiving means for detecting a change in said monitoring frequency and producing a control signal in response to said change, and means responsive to said control signal for producing an alarm signal including holding circuit means for maintaining said alarm signal indeterminately and independent of said control signal and said means for producing said control signal.

18. A system according to claim 17, wherein said vehicle includes a battery and said holding circuit means connects said means for producing an alarm signal to said vehicle battery to maintain said alarm signal independent of said control signal and said means for producing said control signal.

* * * * *